(12) United States Patent
Hess et al.

(10) Patent No.: US 6,776,447 B2
(45) Date of Patent: Aug. 17, 2004

(54) VEHICLE ROOF WITH A TOP WHICH IS MOVABLE BETWEEN CLOSED AND OPEN POSITIONS

(75) Inventors: Reiner Hess, Balingen-Ostdorf (DE); Sébastien Kabache, Ludwigsburg (DE); Artur Mangold, Sulz-Mühlheim (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/377,184

(22) Filed: Feb. 28, 2003

(65) Prior Publication Data

US 2004/0051340 A1 Mar. 18, 2004

Related U.S. Application Data

(63) Continuation-in-part of application No. PCT/EP02/08873, filed on Aug. 8, 2002.

(30) Foreign Application Priority Data

Aug. 28, 2001  (DE) .......................................... 101 41 312

(51) Int. Cl.[7] ................................................. B60J 7/00
(52) U.S. Cl. ................................................. 296/107.17
(58) Field of Search ............................ 296/107.17, 76, 296/107.07, 107.16, 107.08, 181.4, 193.08, 203.04

(56) References Cited

U.S. PATENT DOCUMENTS 6,315,349 B1 * 11/2001 Kinnanen ............... 296/107.17
6,419,294 B2 *  7/2002 Neubrand ..................... 296/76

FOREIGN PATENT DOCUMENTS

| DE | 41 06 732  | 9/1992  |
| DE | 196 13 917 | 10/1997 |
| DE | 196 42 225 | 5/1998  |
| DE | 199 49 960 | 6/2002  |
| EP | 0 806 313  | 11/1997 |
| EP | 1 108 581  | 6/2001  |
| EP | 1 110 782  | 6/2001  |

* cited by examiner

*Primary Examiner*—Lori L. Coletta
(74) *Attorney, Agent, or Firm*—Klaus J. Bach

(57) ABSTRACT

In a vehicle roof support and operating arrangement by which a vehicle roof top can be moved between closed and open positions while supported on a component carrier which also supports a roof top operating mechanism and which is connected to the vehicle body, the component carrier includes a front transverse frame member, a rear transverse frame member and two side frame members extending between, and interconnecting, the front and rear transverse frame members so as to form a closed rigid support frame reinforcing the vehicle body.

11 Claims, 3 Drawing Sheets

VEHICLE ROOF WITH A TOP WHICH IS MOVABLE BETWEEN CLOSED AND OPEN POSITIONS

This is a Continuation-In-Part application of international application PCT/EP02/08873 filed Aug. 8, 2002 and claiming the priority of German Application 101 41 312.2 filed Aug. 28, 2001.

BACKGROUND OF THE INVENTION

The invention relates to a vehicle roof with top parts which are movable between closed and open positions and which are supported by an operating mechanism which is mounted to the body of the vehicle.

DE 196 43 225 C1 discloses a vehicle roof in the form of a coherent module comprising a movable top, a roll-over bar and a roof storage compartment, in which the top is deposited when the roof is open. The storage compartment is enclosed by an essentially U-shaped support frame, which also forms a support structure for the top and the roll-over bar. When installed in the vehicle, the open end of the U-shaped support frame extends toward the front of the vehicle and is delimited in the rear by a vehicle body wall, which extends between the vehicle interior and the luggage compartment. When installed in the vehicle, the vehicle top with its support structure forms a part of the vehicle. In order to achieve sufficient torsional stiffness with respect to torsion about the longitudinal vehicle axis, the side legs of the support frame must be securely fixed to the vehicle body.

DE 199 49 960 C2 discloses another vehicle roof which forms with the top storage compartment, a pre-assembled module. The vehicle roof and the roof storage compartment are coupled to a transverse frame, which is a structural part of the module and extends through the mass center point of the module and by way of which the largest part of the weight forces and the reaction forces resulting from a movement of the roof are transmitted to the vehicle body. This requires an adaptation of the structure with regard to the roof, the roof operating mechanism and the roof storage compartment.

Based on this state of the art, it is the object of the present invention to provide a vehicle top which is pre-assembled on a support frame and forms a module which improves the rigidity of the vehicle body and, particularly, the vehicle stiffness when it is installed in the vehicle body.

SUMMARY OF THE INVENTION

In a vehicle roof support and operating arrangement by which a vehicle top can be moved between closed and open positions while supported on a support frame which also supports the top operating mechanism, and which is connected to a vehicle body, the support frame includes a front transverse frame member, a rear transverse frame member and two side frame member extending between, and interconnecting the front and rear transverse frame members so as to form a closed rigid support frame reinforcing the vehicle body.

In this way, the support frame significantly improves the rigidity and particularly the torsional stiffness of the vehicle body in the transverse as well as the longitudinal vehicle direction. The support frame consequently becomes a structural part of the vehicle body, which increases its strength and which permits a reduction of the amount or the strength of respective components of the vehicle body structure. That is, a basic vehicle body with reduced strength may be used since the support frame for the roof is incorporated into the vehicle body increasing its rigidity and strength. Because of the closed structure of the support frame, the rigidity is improved equally in the transverse and in the longitudinal vehicle direction.

Because of the closed support frame arrangement, which, in a top view, is preferably about rectangular, the support frame may form the corner elements for a rear vehicle space, particularly the trunk or the roof storage compartment of a vehicle. In that case, the support frame is preferably engaging the side walls of the trunk or storage compartment.

The support frame may also support a wall structure which is firmly attached to the frame, particularly a wall structure, which is firmly attached to the front part of the support frame and which extends downwardly therefrom to form the rear wall or part of the rear wall disposed between the vehicle interior and the trunk. The front transverse member of the support frame and the wall structure together form the front part of the support frame.

It may further be expedient to support the trunk lid operating mechanism and also the trunk lid itself on the rear transverse part of the support frame. The support frame and the rear lid including the rear lid operating mechanism then form a module, which can be assembled and tested for proper operation before installation into the vehicle.

The support structure and bearings for the roof operating mechanism and also the roof may be arranged on the front transverse member of the support frame where they can also be pre-assembled and tested for proper operation before installation into the vehicle. The support frame, the vehicle top with the top operating mechanism and the lid with the lid operating mechanism will, in such an embodiment, form a pre-assembled module, which may also include the drive arrangements—that is, hydraulic operating elements, electric motors, control equipment—for the operation of the vehicle top and also for the rear lid. Also, a roll-over bar may be supported on the support frame and be part of the module. The roll-over bar may be rigidly connected to the support frame or it may be mounted in such a way that it is movable relative thereto.

The front transverse member of the support frame is preferably a cast component, particularly an injection molded aluminum component, which is highly rigid but, at the same time, has a relatively low weight. The injection-molded frame part can be formed exactly in the desired shape wherein already during the casting procedure tight tolerances can be maintained so that generally only the areas to be joined to the vehicle body and/or the vehicle top have to be machined after casting. The rear transverse member and also the side parts of the support frame consist preferably of pressed sheet metal, particularly steel sheet metal.

Advantageous embodiments of the invention will be described below in greater detail on the basis of the accompanying drawings.

DESCRIPTION OF PREFERRED EMBODIMENT

Figure 1:
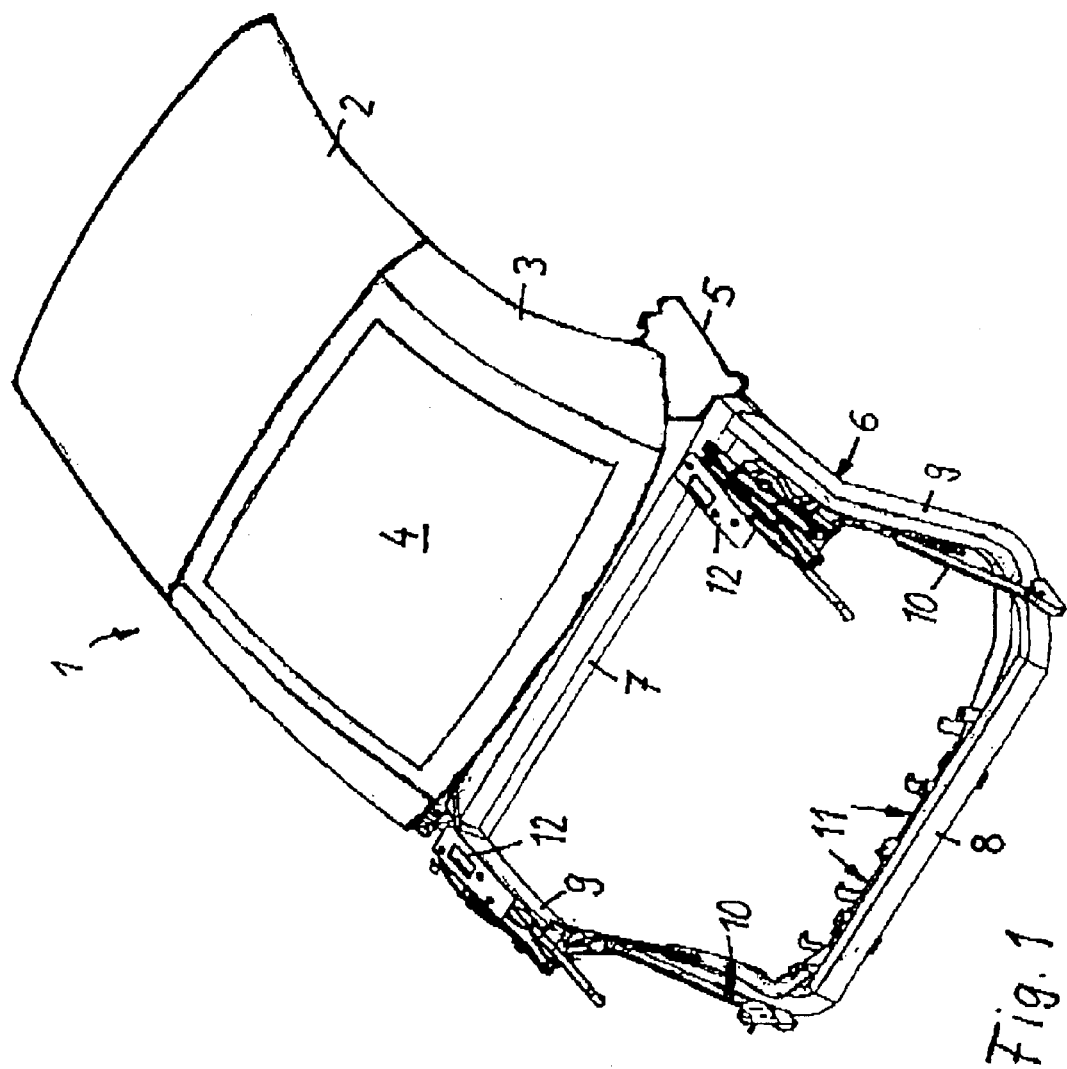
FIG. 1 is a perspective view of a vehicle with the roof in a closed position, wherein the vehicle roof is supported on a closed support frame including a rear transverse frame member on which the rear lid operating mechanism for opening and closing the rear lid is supported.

In the description, identical components are designated by the same reference numerals.

The vehicle roof shown in FIG. 1 is a hardtop vehicle top 1 including a front roof part 2 and a rear roof part 3, which has a rear window panel 4 integrated therein. The roof parts 2 and 3 are rigid roof shells.

The vehicle top however may also be in the form of a soft-top with a top cover material, which is supported by a support linkage.

Figure 2:
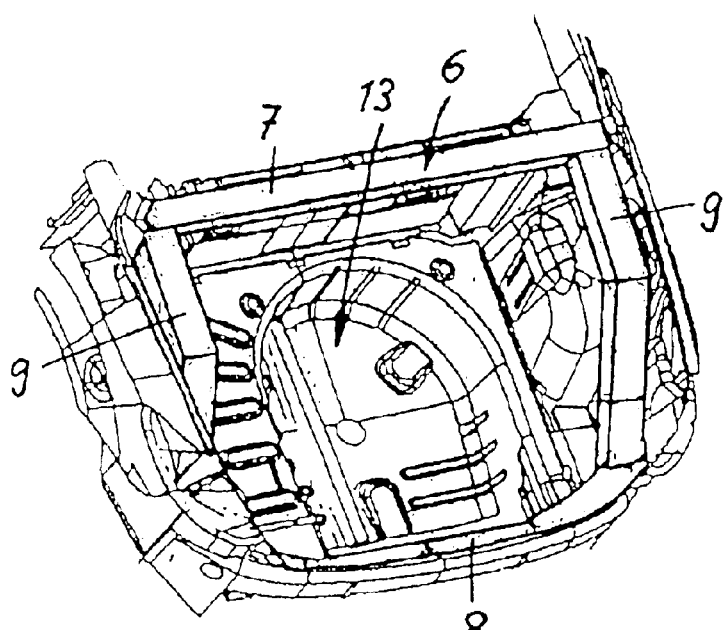
FIG. 2 is a perspective view of the support frame installed in the trunk of a vehicle.

The vehicle top 1 is movably supported on a main support structure 5, which is mounted on a support frame 6. The support frame 6 is expediently a component of the vehicle roof and forms, together with the vehicle top 1, a module, which may be installed in the vehicle as a pre-assembled unit. The support frame 6 is a closed frame structure, which, in a top view, has a rectangular shape. From FIG. 1 showing the vehicle top 1 in the closed position, it is apparent that the support frame 6 extends at the rear end of the vehicle around a roof storage compartment, in which the vehicle top is deposited when the roof is open. FIG. 2 shows the support frame 6 extending around a vehicle trunk space, which includes a storage compartment for the vehicle top. The support frame 6 comprises a front transverse member 7 which is disposed adjacent the vehicle interior, a rear transverse member 8, which is disposed at the rear of the vehicle and two side members 9 which extend between, and interconnect, the transverse members 7 and 8. The front transverse member 7 is preferably a casting, for example an injection molded aluminum casting whereas the rear transverse member 8 and the side members 9 are pressed sheet metal structures, preferably pressed steel sheet metal members. The support frame is symmetrical with regard to a longitudinal center axis of the vehicle.

At the opposite ends of the front transverse frame member 7, the main support structure 5 for the operating mechanism of the top 1 are arranged. The rear transverse frame member 8 includes joints 11 by which a rear lid (not shown) is pivotally supported. The rear lid is pivotable by operating members 10 supported on the support frame 6. The side members 9 are provided, near the front transverse frame member 7, with locking structures 12 which, in the closed position of the rear lid, cooperate with corresponding lock components at the front end of the rear lid for firmly locking the rear lid in its closed position.

Figure 3:
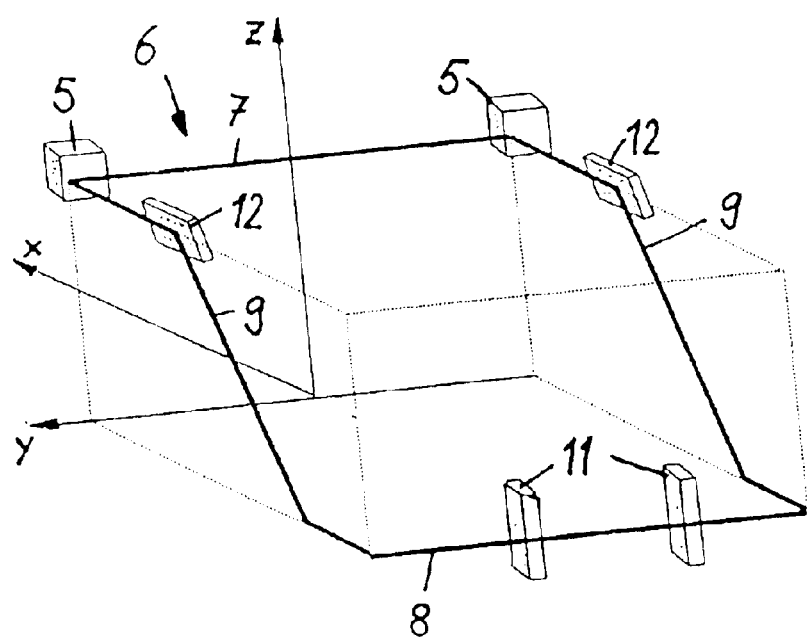
FIG. 3 shows schematically the support frame with the main support areas at the front transverse frame member for supporting the top operating mechanism, the side locking arrangements for locking the trunk lid in the closed position and the pivot structure on the rear transverse member by which the trunk lid is mounted to the support frame.

FIG. 2 shows the trunk 13 of the vehicle with the support frame 6 including the front transverse member 7, the rear transverse member 8 and the two side members 9 disposed in the trunk 13. The front transverse member 7 and the rear transverse member 8 are disposed at a different level since, at its rear end, the trunk has a lower loading edge which facilitates loading and unloading of the trunk. As a result, the rear transverse member 8 is displaced vertically to a lower level with respect to the front transverse member 7. The support frame 6 surrounds the trunk and abuts the trunk walls, which form a part of the vehicle body. In this way, the overall rigidity of the vehicle is increased. The level difference between the front transverse member 7 and the rear transverse member B is accommodated by side members 9 of the support frame, which have inclined sections as clearly shown in the schematic representation of FIG. 3.

Figure 4:
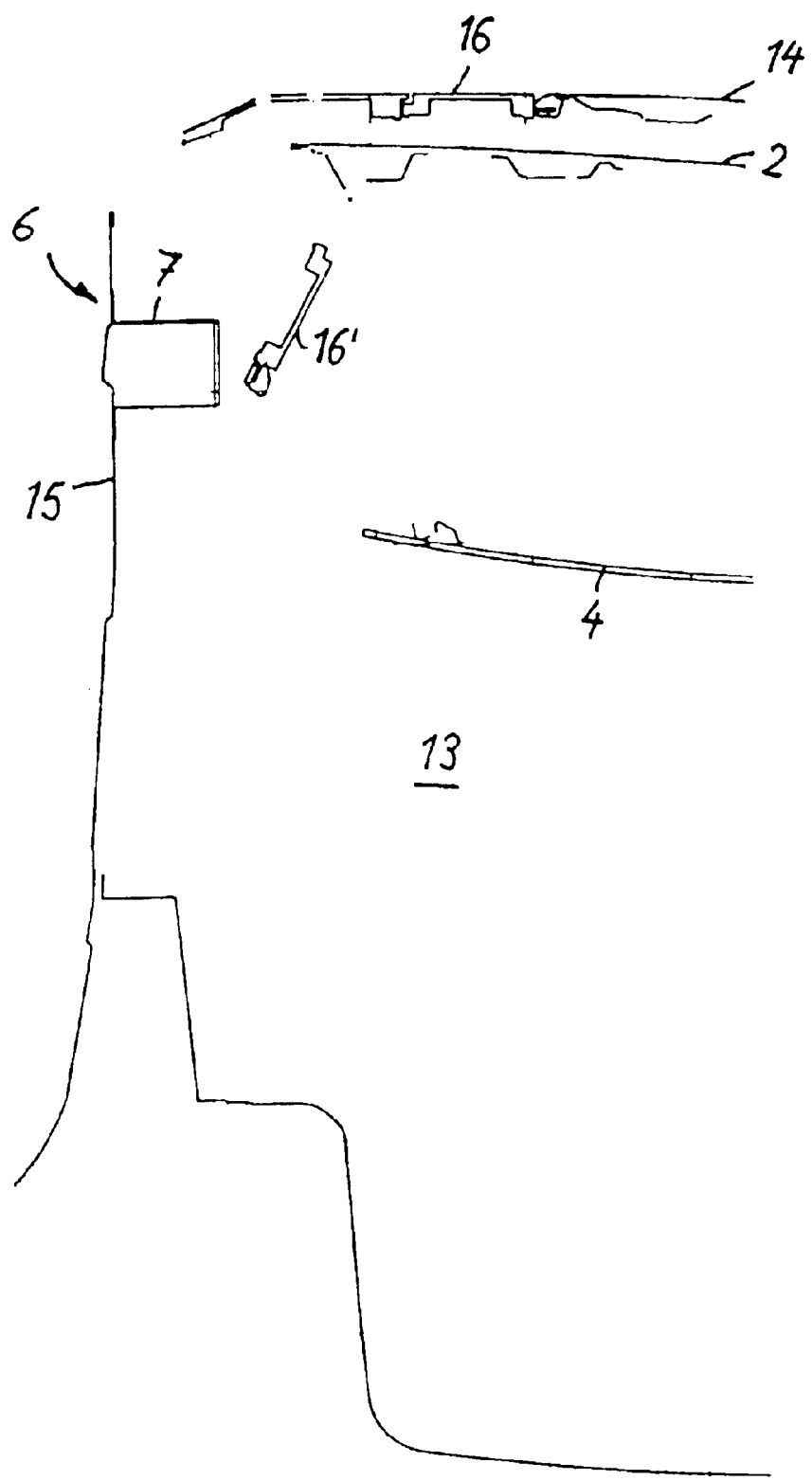
FIG. 4 shows schematically a longitudinal cross-section through the area of the trunk with the vehicle top deposited therein.

From the sectional view of FIG. 4, it is apparent that the front transverse frame member 7 may be firmly connected to the rear wall 15 of the interior vehicle compartment and may form with the rear wall 15 a common structure disposed between the vehicle interior and the trunk 13. FIG. 4 also shows the vehicle top in its open position, in which the top is deposited in the storage compartment or, respectively, in the trunk 13. Shown is the rear window panel 4 and the front roof part 2 of the vehicle top in the storage position. In this position, the rear lid 14 is closed and abuts a movable cover 16 which, in the end positions of the vehicle top, that is, in its closed and storage positions, is disposed in the same plane with the closed rear lid 14. In this position the movable cover 16 closes a passage area to the trunk or, respectively, the storage compartment for the vehicle top, through which passage area the vehicle top is moved during transition between the closed and storage positions. During the transition of the roof parts, the cover 16 is expediently in a position as indicated by 16' within the trunk 13 adjacent the transverse front frame member 7. In its position, in which the cover 16 blocks the passage area, the cover 16 forms expediently a rear storage shelf in the passenger compartment.

What is claimed is:

1. A vehicle roof with a op which is movable between closed and open positions and supported on a component carrier, said component carrier being connected to a vehicle body and including a front transverse frame member, a rear transverse frame member and two side frame members extending between, and interconnecting the front and rear transverse frame members so as to form a closed support frame reinforcing said vehicle body.

2. A vehicle roof according to claim 1, wherein said vehicle includes a rear trunk space delimited by side walls and said support frame extends around the inner circumference of said rear trunk space along the side walls of said trunk space.

3. A vehicle roof according to claim 2, wherein said support frame is in engagement with the side walls of said trunk space.

4. A vehicle roof according to claim 1, wherein said rear transverse frame member includes means or supporting an operating mechanism for a rear lid of the vehicle.

5. ZX vehicle roof according to claim 1, wherein said front transverse frame member is a cast structure.

6. A vehicle roof according to claim 1, wherein said side frame members are pressed metal sheet members.

7. A vehicle roof according to claim 6, wherein said rear transverse member is a pressed metal sheet member.

8. A vehicle roof according to claim 1, wherein said top operating mechanism is supported on said front transverse frame member.

9. A vehicle roof according to claim 4, wherein locking structures are mounted to said side frame members for locking the rear vehicle lid in a closed position.

10. A vehicle roof according to claim 9, wherein said front transverse frame member is joined to a vehicle wall forming a separation wall between a vehicle trunk and an interior space of the vehicle.

11. A vehicle roof according to claim 10, wherein said front transverse frame member with said separation wall and the top operating mechanism connected to the front transverse member, the rear lid operating mechanism connected to the rear transverse frame member and the locking mechanism mounted on the side frame members form a module, which can be installed into the vehicle body in pre-assembled state.

* * * * *